United States Patent
Stammer et al.

(10) Patent No.: US 9,534,083 B2
(45) Date of Patent: Jan. 3, 2017

(54) PRODUCTION OF POLYAMIDES BY POLYCONDENSATION

(71) Applicant: BASF SE, Ludwigshafen (DE)

(72) Inventors: Achim Stammer, Freinsheim (DE); Faissal-Ali El-Toufaili, Ludwigshafen (DE); Simon Gramlich, Hirschberg (DE); Angela Ulzhöfer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 360 days.

(21) Appl. No.: 14/016,520

(22) Filed: Sep. 3, 2013

(65) Prior Publication Data

US 2014/0066588 A1 Mar. 6, 2014

Related U.S. Application Data

(60) Provisional application No. 61/696,232, filed on Sep. 3, 2012.

(51) Int. Cl.
| | | |
|---|---|---|
| *C08G 69/28* | (2006.01) | |
| *C08G 69/42* | (2006.01) | |
| *C08G 69/30* | (2006.01) | |
| *C08G 69/32* | (2006.01) | |
| *C08G 69/06* | (2006.01) | |
| *C08L 77/06* | (2006.01) | |

(52) U.S. Cl.
CPC ............. *C08G 69/42* (2013.01); *C08G 69/06* (2013.01); *C08G 69/28* (2013.01); *C08G 69/30* (2013.01); *C08G 69/32* (2013.01); *C08L 77/06* (2013.01)

(58) Field of Classification Search
CPC ........... C08L 77/06; C08K 5/20; C08G 69/36; C08G 69/32; C08G 69/06
USPC .................... 524/126, 133; 528/323, 346
See application file for complete search history.

(56) References Cited

U.S. PATENT DOCUMENTS

| | | | |
|---|---|---|---|
| 3,379,696 A * | 4/1968 | Wiloth | 526/59 |
| 5,081,222 A | 1/1992 | Reimann et al. | |
| 5,407,266 A | 4/1995 | Dotsch et al. | |
| 6,423,817 B1 | 7/2002 | Weinerth et al. | |
| 2009/0023851 A1 | 1/2009 | Bierdel et al. | |
| 2009/0098325 A1* | 4/2009 | Uchida et al. | 428/36.91 |
| 2010/0090174 A1 | 4/2010 | Weber et al. | |
| 2011/0028614 A1* | 2/2011 | Shikano et al. | 524/126 |
| 2012/0065339 A1 | 3/2012 | Grützner et al. | |
| 2012/0157654 A1 | 6/2012 | El-Toufaili et al. | |

FOREIGN PATENT DOCUMENTS

| | | |
|---|---|---|
| DE | 1545145 | 1/1970 |
| DE | 4118884 A1 | 12/1992 |
| DE | 4413177 A1 | 10/1995 |
| DE | 19940521 A1 | 4/2001 |
| DE | 102007029008 A1 | 12/2008 |
| EP | 299444 A2 | 1/1989 |
| GB | 2006239 A | 5/1979 |
| WO | WO-2008074687 A2 | 6/2008 |
| WO | WO-2009/000408 A1 | 12/2008 |

OTHER PUBLICATIONS

Kohan, Melvin I., et al., "Polyamides", Ullmann's Encyclopedia of Industrial Chemistry, vol. 28, (2012), pp. 537-572.

* cited by examiner

*Primary Examiner* — Gregory Listvoyb
(74) *Attorney, Agent, or Firm* — Drinker Biddle & Reath LLP

(57) ABSTRACT

In a process for producing polyamides by polycondensation of polycondensable polyamide-forming monomers and/or oligomers in reaction mixtures comprising same, which may be water-containing but are free from organic solvents, the polycondensation is effected in an agitated reactor under agitation in a first step in the liquid phase and after a phase change taking place during the process in the same reactor is effected in a subsequent second step in the solid state, wherein the temperature in the reactor is below the melting point of the polyamide in the second step at least.

14 Claims, 1 Drawing Sheet

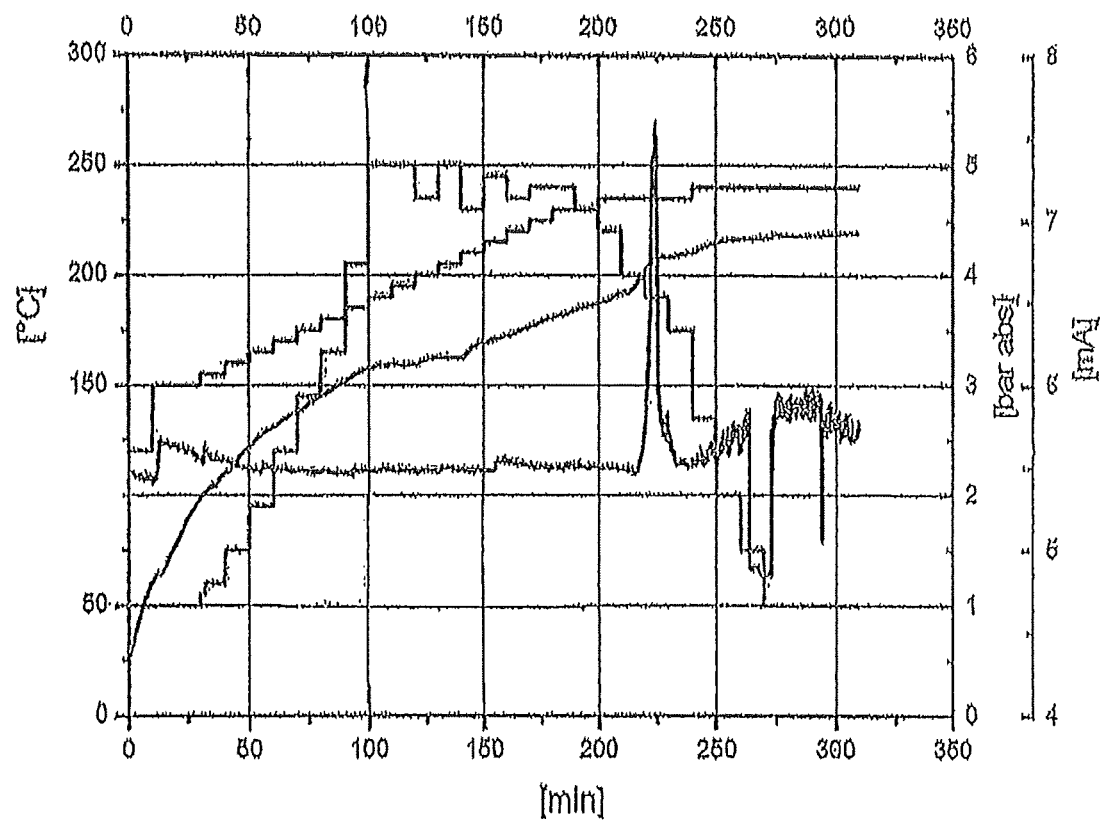

PRODUCTION OF POLYAMIDES BY POLYCONDENSATION

CROSS-REFERENCE TO RELATED APPLICATIONS

This application claims the benefit of U.S. Provisional Application 61/696,232, filed Sep. 3, 2012, which is incorporated herein by reference.

The present invention relates to a process for producing polyamides by polycondensation, to the polyamides thus obtainable and to their use for producing fibers, self-supporting film/sheet or shaped articles.

Many polymers, nylon-6,6 being an example, are produced by polycondensing the starting monomers. Different processes are used for this.

Ullmann's Encyclopedia of Industrial Chemistry, 2012, pages 549 to 552 describes a batch process for producing nylon-6,6 wherein the reaction takes place in an autoclave at a maximum temperature of about 270° C. and a maximum pressure of about 17 bar. A 65 to 80% monomer solution is fed to an autoclave by heating to 210° C. under autogenous pressure up to a pressure of 1.75 MPa. The temperature is then raised incrementally to about 275° C. while steam is released at a rate such that the pressure is maintained. The pressure is then slowly reduced without the reaction mixture cooling. The polymer is subsequently extruded under inert gas. Care is taken in this process to ensure that there is sufficient water to prevent freezing out of the batch before the melting point is reached. Stirred autoclaves can be used.

DE-A-1 545 145 describes a process for producing polyamides from dicarboxylic acids and diamines, or salts thereof, by solid-state polycondensation, wherein the polyamide-forming monomers are initially heated in a sealed vessel under nitrogen to a temperature from 10 to 20° C. below the melting temperature of the monomers for from 2 to 6 hours with stirring. A pressure of 13 to 15 atmospheres gauge becomes established until a precondensate having a solution viscosity of 1.35 to 1.40 has formed. This is followed by depressurization to about 2 atmospheres gauge in the course of 30 minutes with amplified heating and thereafter one to two hours of further condensation while the reactive material is heated to a temperature from 20 to 65° C. below the melting temperature of the final polycondensate.

For example, dry 66 salt is heated in a sealed autoclave at from 190 to 195° C. for four hours with stirring. This is followed by depressurization to 2 atmospheres gauge in the course of 30 minutes and heating at from 200 to 205° C. for three hours under a nitrogen stream with continued stirring. The polyamide obtained is then cooled down. It has a melting point of 262 to 266° C.

This solid-state polycondensation has the disadvantage that the process temperature is limited by the melting point of the starting materials, which leads to a low manufacturing capacity.

A polycondensation without a solvent at a temperature above the melting point of the polymer obtained leads by reason of the high temperature to secondary reactions which can lead to inferior properties on the part of the polymer.

Solution polycondensation, in which the starting monomers are dissolved in a solvent, is practiced as an alternative. Its disadvantage is that the polycondensates obtained have to be separated from the solvent and dried, which necessitates additional process steps.

It is an object of the present invention to provide a process for producing polyamides by polycondensation in the absence of organic solvent or diluent, which can be carried out at a temperature which leads to a maximized manufacturing capacity and at the same time minimizes the occurrence of secondary reactions.

This object is solved according to the present invention by a process for producing polyamides by polycondensation of polycondensable polyamide-forming monomers and/or oligomers in reaction mixtures comprising same, which may be water-containing but are free from organic solvents, wherein the polycondensation is effected in an agitated reactor under agitation in a first step in the liquid phase and after a phase change taking place during the process in the same reactor is effected in a subsequent second step in the solid state, wherein the temperature in the reactor is below the melting point of the polyamide in the second step at least.

The object is also solved by polyamides obtainable by this process and also by the use of these polyamides in the manufacture of fibers, self-supporting film/sheet or shaped articles.

BRIEF DESCRIPTION OF THE DRAWING

FIG. 1 shows exemplary experimental conditions for the process of the invention.

DETAILED DESCRIPTION OF THE INVENTION

The inventors found that the production of polyamide polycondensates at high manufacturing capacity coupled with reduced secondary reactions is possible by performing the polycondensation at temperatures above the melting point of the monomers, but below the melting point of the resulting polyamide in the absence of a solvent or diluent means other than water in a reactor capable of providing the necessary residence time. The process of the present invention provides polycondensates of high molecular weight on using essentially equivalent amounts of monomers. The polycondensation proceeds with increasing molecular weight to eventually form higher molecular weight condensates, the melting points of which are generally above the melting points of the low molecular weight precursors, such as monomers or oligomers. Once the melting point of the reaction mixture is higher than the operating temperature of the reactor, there is a solidification of product and the reaction is continued in the solid state. The agitator provided in the reactor subdivides the solid polycondensate. The course of the polycondensation can be tracked via the energy requirements of a mechanical mixer for example. As long as the liquid mixture of monomers or low molecular weight polycondensates is agitated, only a moderate level of mixing energy is needed. As soon as there is an increase in the molecular weight and melting point of the polycondensate to above the reactor temperature, the reaction mixture solidifies, which leads to greatly increased energy requirements of the mixer. As the solid polycondensate subdivides, the continued need for mechanical energy goes back down.

The process of the present invention is generally a batch process in which the monomers, which may contain water, are introduced into a reactor which is equipped with a, generally mechanical, mixer. Any suitable reactor of the type known customary for polycondensations can be used. Stirred autoclaves are one possibility for example. The use of mixer-kneaders is also possible. Suitable mixer-kneaders generally have two or more axially parallel rotating shafts where the main shaft may be equipped with disk areas, with peripherally disposed kneading bars. Suitable mixer-kneaders are described in DE-A-41 18 884 and DE-A-199 40 521.

The process of the present invention is particularly characterized in that there is a reaction in the first step in the liquid phase, then a phase change and a subsequent reaction in the second step in the solid state in only one reactor without the reaction mixture being discharged, or transferred into another reactor, in between. According to the present invention, the second step is preferably carried out immediately following the first step, in the very same reactor.

The term "phase change" refers to a phase transition from the liquid phase to the solid state in the reactor.

The temperature in the reactor is below the melting point of the polyamide in the second step at least of the process according to the present invention. Preferably, the temperature in the reactor is below the melting point of the product polyamide throughout the entire process.

Preferably, the temperature in the reactor is above the glass transition point of the polyamide in the second step and hence between the glass transition point of the polyamide and the melting point of the polyamide.

It is particularly preferable to produce polyamides (polycondensates) in the process of the present invention which have a melting point of at least 260° C. and more preferably at least 265° C. on completion of the second step.

The maximum temperature in the reactor is preferably at least 25° C., more preferably at least 30° C. and especially at least 35° C. below the melting point of the polyamide in the second step. It is particularly preferable for the maximum temperature in the reactor to be at least 40° C. below the melting point of the polyamide.

The temperature in the reactor rises continuously and/or incrementally in the course of the polycondensation preferably up to the phase change.

The reaction time in the first step is preferably in the range from 0.5 to 10 hours, more preferably in the range from 2 to 6 hours and especially in the range from 3 to 4 hours.

The reaction time in the second step is preferably in the range from 0.3 to 5 hours, more preferably in the range from 0.5 to 2 hours and especially in the range from 1 to 2 hours.

Preferably, no solid-state polycondensation is effected before the polycondensation in the first step, meaning that the polycondensation of the present invention encompasses initially the reaction in the liquid phase and only subsequently the reaction in the solid state, but does not encompass a solid-state reaction before the liquid-phase reaction.

In the process of the present invention, the polycondensation is preferably conducted at a pressure of not more than 10 bar, more preferably not more than 7 bar and especially not more than 5.5 bar.

The maximum temperature in the reaction is preferably from 200 to 250° C. and more preferably from 210 to 230° C., especially in the production of nylon-6,6.

The polycondensable monomers and/or oligomers may be water-containing at the start of the polycondensation, and/or be used in admixture with water. The weight ratio of polycondensable monomers to water is preferably in the range from 0.5:1 to 5:1, more preferably in the range from 1:1 to 2:1 and especially in the range from 1.2:1 to 1.7:1.

The process of the present invention may initially be carried out by heating under autogenous pressure until the desired target pressure (maximum pressure) is reached. Once it has been reached, a gas phase can be discharged from the reaction mixture in order that the maximum pressure may be established at the desired reaction temperature. Typically, water present in the reaction mixture or formed by the polycondensation is discharged in vapor form in the course of the reaction. Low molecular weight compounds formed in the course of the polycondensation, which are released by the polycondensing monomers, can also be discharged in vapor form.

Typically, the pressure rises in the course of the first process step from ambient pressure all the way to maximum pressure. In the course of the second step, the pressure is then preferably gradually reduced to ambient pressure, at which the polycondensate obtained is then discharged from the reactor.

It is particularly preferable to use the process for producing polyamides obtained by reaction of dicarboxylic acids and diamines. Homopolymers or copolymers may be concerned here. It is also possible to additionally use dicarboxylic acids and diamines, lactams, aminonitriles or amino carboxylic acids, for example caprolactam or capryllactam.

In addition to dicarboxylic acids and diamines it is also possible to use salts formed from the dicarboxylic acids and diamines as starting monomers.

The polyamides may be aliphatic, partly aromatic or wholly aromatic. They may additionally be amorphous, partly crystalline or wholly crystalline. The polyamides may further have any desired suitable viscosities/molecular weights. Polyamides of aliphatic, partly crystalline or partly aromatic and also amorphous construction are particularly suitable.

Their viscosity numbers may be for example in the range from 90 to 350 and preferably from 110 to 240 ml/g, as determined in a 0.5 wt % solution in 96 wt % sulfuric acid at 25° C. in accordance with ISO 307.

As dicarboxylic acids that can be used, alkanedicarboxylic acids of 6 to 12, especially 6 to 10 carbon atoms and aromatic dicarboxylic acids are preferred. Adipic acid, azelaic acid, sebacic acid, dodecanedioic acid and terephthalic and/or isophthalic acid may be recited here as acids.

Useful diamines include particularly alkanediamines of 2 to 12, especially 6 to 8 carbon atoms and also m-xylylenediamine, di(alpha-aminophenyl)methane, di(4-aminocyclohexyl)methane, 2,2-di(aminophenyl)propane or 2,2-di(4-aminocyclohexyl)propane and also p-phenylenediamine.

Preferred polyamides are polyhexamethyleneadipamide (PA66) and polyhexamethylene-sebacamide (PA610) and also copolyamides 6/66, especially with from 5 to 20 wt % of caprolactam units.

Mention may also be made of polyamides which are derived by condensation of 1,4-diamino-butane and adipic acid under elevated temperature (nylon-4,6).

Such partly aromatic copolyamides as PA 66/6T, the triamine content of which is less than 0.5 wt % and preferably less than 0.3 wt %, see EP-A-0 299 444 and WO 2008/074687, have also proven particularly advantageous.

The following schedule, which is not conclusive, comprises the polyamides mentioned and also further polyamides within the meaning of the present invention (it is the monomers which are indicated between parentheses):

PA 26 (ethylenediamine, adipic acid)
PA 210 (ethylenediamine, sebacic acid)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)

PA 1313 (1,13-diaminotridecane, undecanedicarboxylic acid)

PA MXD6 (m-xylylenediamine, adipic acid)

PA TMDT (trimethylhexamethylenediamine, terephthalic acid)

polyphenylenediamineterephthalamide (p-phenylenediamine, terephthalic acid)

These polyamides are known per se. Details regarding their methods of making are found by those skilled in the art in Ullmanns Enzyklopädie der Technischen Chemie, 4th edition, Vol. 19, pp. 39-54, Verlag Chemie, Weinmann 1980, and also Ullmann's Encyclopedia of Industrial Chemistry, Vol. A21, pp. 179-206, VCH Verlag, Weinheim 1992, and also Stoeckhert, Kunststofflexikon, pp. 425-428, Hanser Verlag Munich 1992 (headword "Polyamide" and following).

It is additionally possible according to the present invention to provide functionalizing compounds in the polyamides that are capable of attaching to carboxyl or amino groups and have, for example, at least one carboxyl, hydroxyl or amino group. Such functionalizing compounds preferably comprise branching monomers, for example monomers having three or more carboxyl or amino groups, monomers capable of attaching to carboxyl or amino groups, for example via epoxy, hydroxyl, isocyanato, amino and/or carboxyl groups, and having functional groups selected from hydroxyl, ether, ester, amide, imine, imide, halogen, cyano and nitro groups, C—C double or triple bonds, or polymer blocks capable of attaching to carboxyl and amino groups, examples being poly-p-aramid oligomers.

By using the functionalizing compounds, the property spectrum of product polyamides becomes freely adjustable within wide limits.

For example, triacetonediamine compounds can be used as functionalizing monomers. They are preferably 4-amino-2,2,6,6-tetramethylpiperidine or 4-amino-1-alkyl-2,2,6,6-tetramethylpiperidine, in each of which the alkyl group has 1 to 18 carbon atoms or is replaced by a benzyl group. The amount in which the triacetonediamine compound is present is preferably in the range from 0.03 to 0.8 mol % and more preferably in the range from 0.06 to 0.4 mol %, all based on 1 mol of acid amide groups of the polyamide. For further description, reference may be made to DE-A-44 13 177.

The second step of the process according to the present invention may be additionally followed by a postcondensation at ambient pressure, preferably by flushing with an inert gas. Postcondensation provides a further significant increase in the molecular weight.

The polyamides obtainable according to the present invention can be used in a known manner to produce fibers, self-supporting film/sheet or shaped articles. The polyamides may comprise the main portion of thermoplastic molding materials.

The thermoplastic molding materials of the present invention may further comprise further additives such as further fillers, for example glass fibers, stabilizers, oxidation retarders, agents against thermal decomposition and decomposition by ultraviolet light, lubricating and demolding agents, colorants such as dyes and pigments, nucleating agents, plasticizers, and so on. These further additives are typically present in amounts of 0 to 50 wt % and preferably 0 to 35 wt %. For a more detailed description of possible additives, reference may be made to WO 2008/074687, pages 31 to 37.

The thermoplastic molding materials of the present invention are produced, for example, by extrusion at a temperature preferably in the range from 170 to 350° C., more preferably 200 to 300° C.

A process as described in DE-A-10 2007 029 008 can be used for example. WO 2009/000408 can further be referenced for the production process.

The thermoplastic molding material may be further processed in a known manner, for example by injection molding or compression molding.

The examples which follow provide more particular elucidation of the invention.

EXAMPLES

Example 1

Production of Nylon-6,6

Nylon-6,6 was produced by batchwise condensation in a twin-screw kneader. For this, 1.3 kg of 66 salt and 0.9 kg of water were incrementally heated to 160° C. under kneading. The resulting pressure was about 5 bar. The greatest share of the water was distilled off under these conditions. Kneader rotary speed was about 25 min$^{-1}$. The pressure level of about 5 bar was adjusted with decreasing water content by raising the temperature to 220° C., while the distillation quantity was adjusted manually using a needle valve. As water content decreased, the vapor pressure of the mixture was reduced, as a result of which the temperature was made constant at a maximum temperature of about 220° C.

After the pressure had been reduced to the ambient pressure of about 1 bar, the mixing chamber was flushed with nitrogen to remove the remaining water vapor and prevent the ingress of air. Reducing the water content leads to an increase in the viscosity of the water-polymer mixture. A maximal value of the energy pick-up of the kneading motor was observed, which indicated the phase change. Solid particles of the polycondensate were generated thereafter, and the energy pick-up came back down. On opening the kneader, the material was obtained as free-flowing granules.

The nylon-6,6 obtained had a viscosity number of 93 ml/g, an amino end group content of 46 mmol/kg, a carboxyl end group content of 165 mmol/kg, a number-average molecular weight of 16 200 g/mol, a weight-average molecular weight of 39 600 g/mol and an $M_w/M_n$ ratio of 2.4.

The experimental conditions are depicted in accompanying FIG. 1.

FIG. 1 is a plot of the pressure (in bar abs), the prerun temperature (in ° C.), the chamber temperature (in ° C.) and the energy pick-up of the drive (in mA) versus the time (in min.). The corresponding curves in the FIGURE can be seen in the stated order from top to bottom at a time of 100 minutes.

Example 2

A partly aromatic polyamide was produced using a 10 liter capacity, electrically heated, stirred tank reactor. A monomer salt mixture of the following composition was introduced at room temperature:

| | |
|---|---|
| Hexamethylenediamine | 1726.7 kg |
| m-Phenylenebis(methylamine) | 99.6 g |
| Terephthalic acid | 1822.3 g |

-continued

| | |
|---|---|
| Isophthalic acid | 749.2 kg |
| Sodium hypophosphite monohydrate | 1.36 kg |

The melting point of the resulting monomer salt was determined by DSC and found to be 228° C.

The reactor was then sealed and three times pressurized to 10 bar with nitrogen and let down to remove traces of oxygen. The reactor was subsequently heated to a temperature of 250° C. The polycondensation took place in the sealed reactor at this reactor temperature for 2 hours. After 15 minutes' reaction time the reaction mixture solidified and the reaction was continued for the remaining time to 2 hours with formation of water. After 2 hours the reactor was cooled to room temperature and the solid product was analyzed by GPC. The polyamide had a number-average molecular weight of 3820 g/mol, a weight-average molecular weight of 8120 g/mol and an $M_w/M_n$ ratio of 2.1.

Subsequently, 50 g of this product were filled into a 200 ml capacity glass vessel of a rotary evaporator and heated to 250° C. in a heating bath under 30 l/h nitrogen stream and atmospheric pressure. After 30 hours the sample was cooled to room temperature and the molecular weight was determined by GPC measurement. The polyamide obtained had a number-average molecular weight of 19 800 g/mol, a weight-average molecular weight of 67 500 g/mol and an $M_w/M_n$ ratio of 3.4.

We claim:

1. A process for producing a polyamide by polycondensation of polycondensable polyamide forming monomers and/or oligomers in reaction mixtures comprising same, which are free from organic solvents, wherein the polycondensation is effected in an agitated reactor under agitation in a first step in the liquid phase and after a phase change taking place during the process in the same reactor is effected in a subsequent second step in the solid state, wherein the temperature in the reactor is below the melting point of the polyamide in the second step,
    wherein the polycondensation is conducted at a pressure of not more than 10 bar, and
    wherein the polycondensable monomers and/or oligomers are present at the start of the polycondensation in a weight ratio to water ranging from 1.2:1 to 1.7:1.

2. The process according to claim 1 wherein the temperature in the reactor is above the glass transition point of the polyamide in the second step.

3. The process according to claim 1 wherein the polyamide has a melting point of at least 260° C.

4. The process according to claim 1 wherein no solid-state polycondensation is effected before the polycondensation in the first step.

5. The process according to claim 1 wherein the maximum temperature in the reactor is at least 25° C. below the melting point of the polyamide in the second step.

6. The process according to claim 5 wherein the maximum temperature in the reactor is at least 30° C. below the melting point of the polyamide in the second step.

7. The process according to claim 5 wherein the maximum temperature in the reactor is at least 35° C. below the melting point of the polyamide in the second step.

8. The process according to claim 1 wherein the polycondensation is conducted at a pressure of not more than 7 bar.

9. The process according to claim 1 wherein the polycondensation is conducted at a pressure of not more than 5.5 bar.

10. The process according to claim 1 wherein the temperature in the reactor rises continuously and/or incrementally in the course of the polycondensation up to the phase change.

11. The process according to claim 1 wherein low-boiling compounds formed in the course of the condensation and/or water are separated off in gaseous form during the first and/or second step of the polycondensation.

12. The process according to claim 1 wherein the second step is followed by a postcondensation at ambient pressure, preferably under flushing with an inert gas.

13. A polyamide obtained by the process according to claim 1.

14. The polyamide according to claim 13 in the shape of fibers, self-supporting film/sheet or shaped articles.

* * * * *